(No Model.)
J. W. MALOY.
DRESSING STONE.
No. 350,936. Patented Oct. 19, 1886.
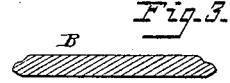
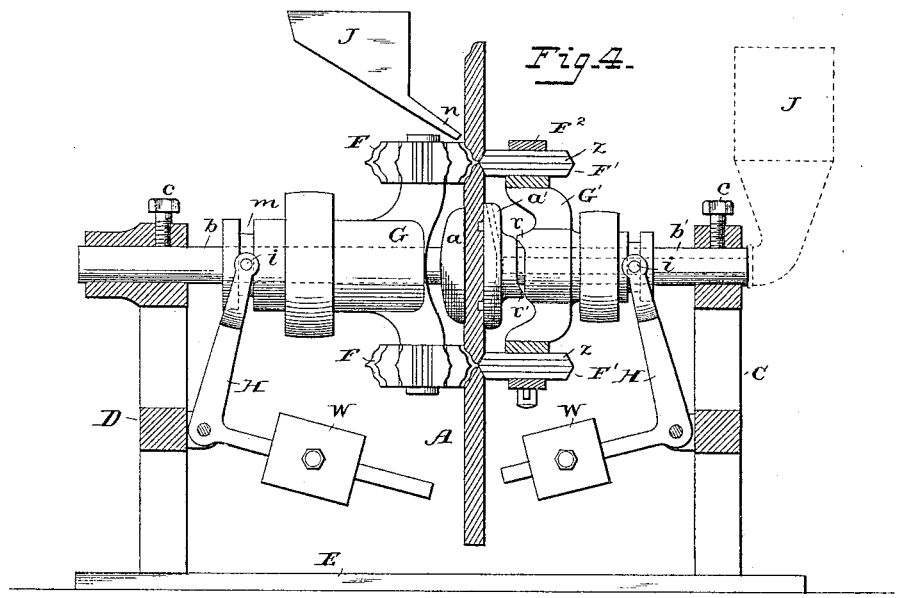
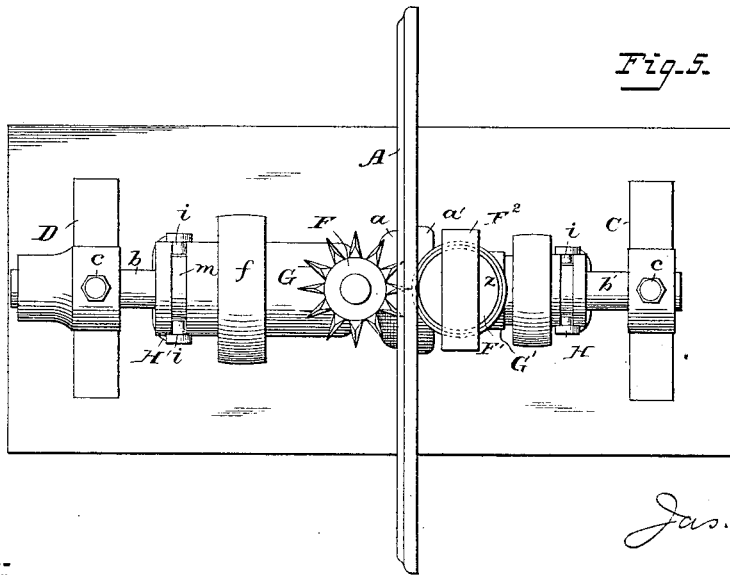
Attest:
Court A Cooper
A. E. Hansmann
Inventor:
Jas. W. Maloy
By Foster & Freeman
Attys.

UNITED STATES PATENT OFFICE.

JAMES W. MALOY, OF BOSTON, MASSACHUSETTS.

DRESSING STONE.

SPECIFICATION forming part of Letters Patent No. 350,936, dated October 19, 1886.

Application filed September 15, 1885. Serial No. 177,204. (No model.)

*To all whom it may concern:*

Be it known that I, JAMES W. MALOY, a citizen of the United States of America, residing at Boston, in the county of Suffolk and State of Massachusetts, have invented certain new and useful Improvements in the Manufacture of Tops for Wash-Stands, &c., of which the following is a specification, reference being had therein to the accompanying drawings.

My invention relates to the manufacture of that class of marble tops for wash-stands which are provided with central openings for access to the basins; and my invention consists in operating upon each slab by means of a cutting-tool constructed to cut the required opening and impart at the same operation an ornamental finish to the cut edge of the slab, and also to the edge of the disk cut therefrom, thereby avoiding the expense of separate operations for cutting out the disk and finishing the edges.

In the drawings, Figure 1 is a sectional view illustrating the ordinary method of cutting slabs in the manufacture of tops for wash-stands; Figs. 2 and 3, sectional views illustrating my invention; Fig. 4, a sectional elevation of a machine used in carrying out my invention; Fig. 5, a plan view of Fig. 4.

In the usual manufacture of marble tops for wash-basins, &c., it is common to cut a slab, A, Fig. 1, of suitable proportions, so as to form a circular opening by making an annular channel, $x$, by means of any suitable tool, thereby preserving the center portion of the slab within the channel in the form of a circular disk, B, which may be used for a table-top or other purpose. After the opening is formed and the disk B removed the edge of the slab is subjected to the action of a proper tool, so as to impart an ornamental bevel or ogee shape thereto, as shown in Fig. 2, and the edge of the disk B is also operated upon to reduce it to a similar form, as shown in Fig. 3. It will thus be seen that at least three operations are required to form the opening in the slab, remove the disk, and properly shape the edges of the opening and the disk. To avoid expense and delay incident to this series of operations, I subject the slab to the action of tools so arranged and operated as to impart the proper forms to the edges in the act of cutting a slab to form the opening and disk. The tool by which this effect is produced travels in circular paths to operate upon the parts to be cut away, upon one or both sides of the slab, and is of any of the usual or suitable constructions.

In the form of apparatus shown in the drawings the slab A is held in a vertical position between two upright frames, C D, secured to a base, E; but it may in some instances be operated upon when arranged horizontally—as, for instance, when a cut is made only from the upper side.

A convenient mode of securing the slab is to clamp it between two circular blocks or clamp-heads, $a$ $a'$, secured to bars or shafts $b$ $b'$, each extending through an opening in one of the frames C D, and being firmly secured after the slab is clamped in position by means of a set-screw, $c$, or otherwise. The outer portion of the slab is operated upon by one, two, or more cutters, F, carried by a cutter-head, G, revolving upon a shaft, $b$, one form of cutter in the apparatus shown consisting of a hub with a series of radial blades, the edges of which correspond to the shape to be imparted to the edges of the slabs, the cutters traversing in a circular path as the head G revolves and each rotating upon its own axis. The head G is rotated by any suitable means—as, for instance, by means of a belt passing round the band-pulley $f$ upon the head—and in order to force the cutters toward the slab when the latter is horizontal I either feed the head positively or press it toward the slab by means of a weight, W.

One means of using the weight is illustrated in the drawings, and consists in applying it to the lower arm of the bell-crank lever H, pivoted at its corner to the frame D, the upper forked end of the lever carrying studs $i$, projecting into an annular groove, $m$, in the head G. This arrangement permits the free revolution of the head and allows it to be drawn back and forth upon the shaft $b$, while forcing it with a regulated pressure toward the slab when the cutters are in operation. When it is desired to cut from both sides of the slab at the same time, a second head, G', is arranged to revolve upon the shaft $b'$, and carries a second set of cutters, F'. A preferable form of cutter consists of a series of annular blades, Z, one inclosing the other and set so that their edges will present a cutting-face of proper form, all being held tightly in place by a circumferential band, F², which may be contracted to bind the cutter-blades together.

The sand and water necessary to facilitate the cutting operations in most instances is fed from the hopper to the part to be cut by means of suitable conductors. For instance, the hopper J may be suspended, as shown, at the left in Fig. 4, a conducting-spout, $n$, extending from the hopper to the slab adjacent to the cut; or the hopper may communicate with a channel extending through the shaft and communicating with the radiating distributing-channels, as shown in dotted lines in connection with the shaft $b'$. When an annular cutter is used, as shown, with the head G', it is best to move it away from the slab at intervals, to permit the sand to get beneath the cutting-edges. This is done by reciprocating the cutter-head in any suitable manner. For instance, a beveled lug, $r$, on the head G' strikes a like lug, $r'$, on the clamp head $a'$ at each revolution, and this causes the head to move back slightly.

It will be seen that by operating upon the slab as above described the basin opening is formed, the central disk cut out, and an ornamental edge is imparted to both at a single operation, thereby greatly reducing the cost of the manufacture.

I am aware that in wood-working it is common to use revolving tools that form annular ornamental grooves; but my invention is distinguished from such operations by the fact that I operate upon the slab to remove a section thereof that has heretofore been cut out in a different way, and that, simultaneously with this removal, I ornament the edges of both the slab and the part removed.

I do not here claim the construction of the apparatus used in carrying out my improvement, as the same forms the subject of a separate application for Letters Patent.

I claim—

The process in the manufacture of wash-stand tops, &c., consisting in cutting a circular or other shaped section from a slab, and, simultaneously with said cutting, forming ornamental edges on the slab-sections, substantially as described.

In testimony whereof I affix my signature in presence of two witnesses.

JAMES W. MALOY.

Witnesses:
CHARLES E. FOSTER,
E. F. ENDICOTT.